Patented Aug. 16, 1932

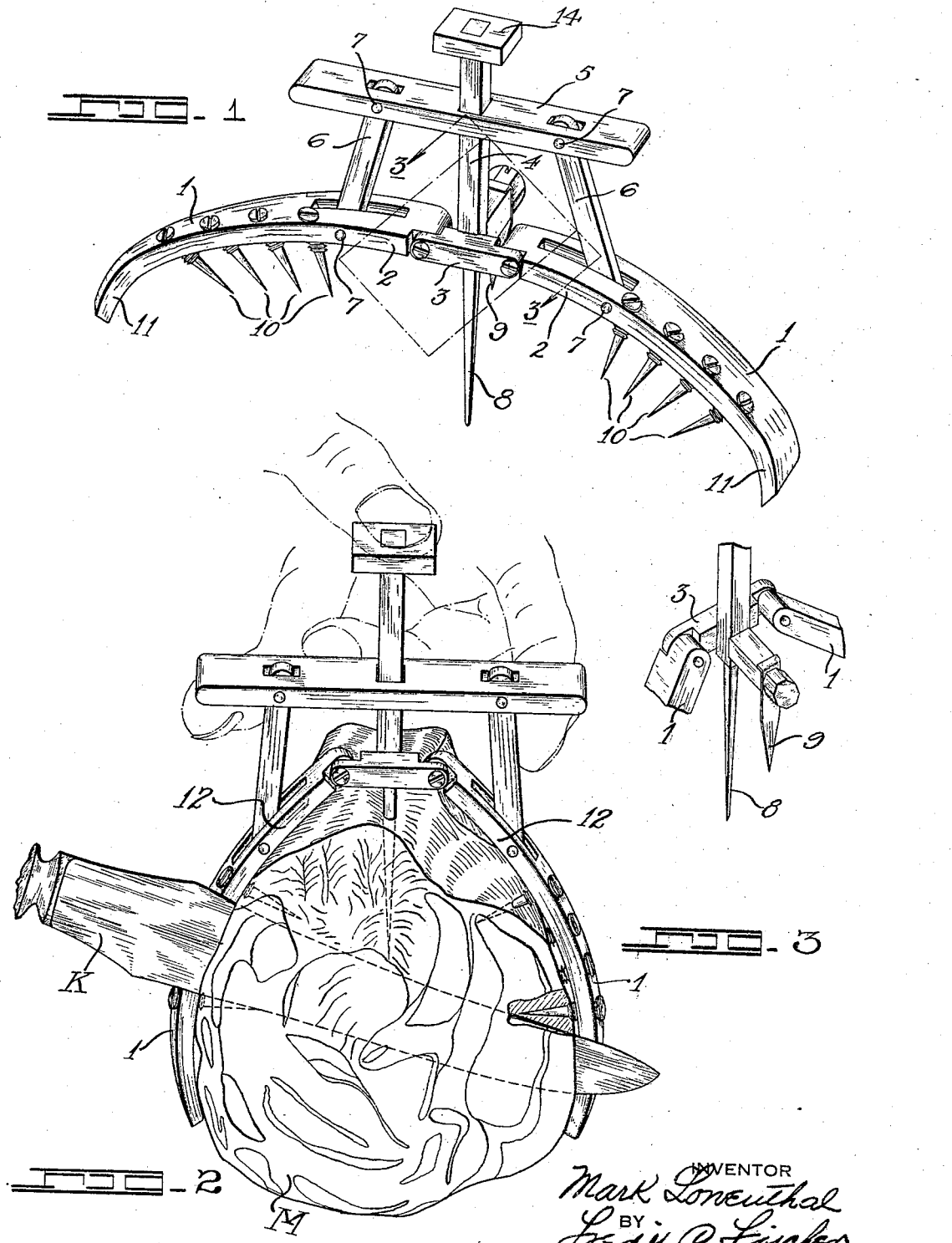

1,871,713

UNITED STATES PATENT OFFICE

MARK LOWENTHAL, OF ELIZABETH, NEW JERSEY

MEAT HOLDING DEVICE

Application filed October 16, 1931. Serial No. 569,133.

This invention relates to meat holding devices, and an object of my invention is to provide a device of this character which may be readily applied to and removed from various articles of meat and poultry to hold or carry the same and which obviates the necessity of touching the articles with the hands, and also provides a sanitary and effective guide for the meat-cutting knife.

A further object of my invention is to provide a device of this character comprising a pair of arcuate arms pivotally secured, at one end, to a horizontal block provided with a stem for manipulating the device, said stem passing freely through a horizontal plate to which said arms are secured by links, whereby, by holding the horizontal plate against movement and pulling the stem upward, the arms will be drawn inwardly to embrace the sides of the article, and by moving the stem downward or in the opposite direction, the arms will be moved outwardly away from and clear of the article of meat or the like.

These and other objects are attained by the novel construction, combination and arrangement of parts hereinafter described and shown in the accompanying drawing, constituting a material part of this disclosure, and in which:

Fig. 1 represents a perspective view of my improved device,

Fig. 2 represents an elevational view of my device applied to an article of meat, showing the manner in which the meat-cutting knife bears against and is guided by the front edge of the device during the cutting operation, and Fig. 3 represents a fragmentary perspective view taken on line 3—3 of Fig. 1, in the direction indicated by the arrow.

My device comprises, essentially, a pair of arcuate arms 1—1 pivotally secured, at their upper ends 2—2, to a horizontal block 3, said block 3 having secured thereto, in any desired or convenient manner, a stem 4 which passes freely through a suitable horizontal plate 5. A pair of links 66 are pivotally connected, at opposite ends, to the horizontal plate 5 and to the arcuate arms 1—1, in any desired or convenient manner, as by means of pivots 7—7.

The stem 4, secured to the horizontal block 3, is provided with a downwardly extending prong 8. The block 3 is further provided with a shorter, downwardly extending prong 9 spaced rearwardly of said prong 8.

A gripping device 14, which may be of any desired or convenient shape, is secured to the upper end of the stem 4 in any desired or convenient manner. In applying the device to an article of meat M, it is merely necessary to grasp the gripping device 14 and press the stem 4 downwardly to push the prongs 8 and 9 into the top of the article M at a point just beyond that at which it is desired to cut the meat (see Fig. 2), to position the device thereon, and by pressing downwardly on the horizontal plate 5, the arms 1—1, connected thereto by the links 6—6 will be moved inwardly and into holding engagement with the sides of the article M. The arms 1—1 are preferably sharply bent inwardly at their lower, free ends 11—11, and are provided, on their inner faces, with meat-piercing prongs 10, to insure their positive holding engagement with the sides of the article M. The prongs 10 have screw threaded engagement with the arms 1—1 so that they may be readily secured to or removed therefrom for sanitary purposes, or if desired, the prongs 10 may be integrally secured to said arms 1—1.

To remove the device from the article, it is merely necessary to draw the horizontal plate 5 upwardly, thus moving the arms 1—1 outwardly and away from the article M, the device being then lifted by the gripping device 14 of the stem 4, the user's hand being preferably positioned as indicated in dotted lines in Fig. 2.

The front edge 12 of the device provides a guide against which the knife K may bear while the knife is moved during the cutting operation (see Fig. 2) thus assuring a straight cut of meat. The spreading and shifting of the body of the article while it is being cut is prevented by the embracing and holding engagement of the device with the article.

The device provides a highly sanitary arrangement for holding articles of meat and for guiding the knife during the cutting operation, obviating the necessity for touching the article with the hands for this purpose. The device is admirably adapted for lifting poultry out of the roast pan and placing the same on a platter.

The foregoing disclosure is to be regarded as descriptive and illustrative only and not as restrictive or limitative of the invention of which obviously an embodiment may be constructed including many modifications without departing from the general scope herein indicated and denoted in the appended claim.

Having thus described my invention, what I claim as new and desire to secure by Letters Patent, is:—

A device of the character described comprising a horizontal block provided with a downwardly extending prong for piercing an article of meat to position the block thereon and provided with an upwardly extending operating stem, a pair of arcuate arms pivotally secured to said block for holding engagement with the sides of the article of meat, said arms being provided with meat-piercing prongs, a horizontal plate located above the horizontal block and provided with an opening through which the operating stem passes, and links pivotally connected, at opposite ends, to said plate and to said arms, all of said parts being arranged in proper vertical alignment so that a meat-cutting knife may bear against and be guided by the front edge of the device while the knife is moved back and forth.

This specification signed this 14th day of October, 1931.

MARK LOWENTHAL.